United States Patent [19]
Kosuge et al.

[11] Patent Number: 4,575,844
[45] Date of Patent: Mar. 11, 1986

[54] DIGITAL SWITCHING SYSTEM

[75] Inventors: Yasuharu Kosuge; Noriharu Miyaho, both of Tokyo, Japan

[73] Assignee: Nippon Telegraph & Telephone, Tokyo, Japan

[21] Appl. No.: 615,438

[22] Filed: May 30, 1984

[30] Foreign Application Priority Data

Jun. 3, 1983 [JP] Japan .................................. 58-99239

[51] Int. Cl.$^4$ .......................................... H04Q 11/04
[52] U.S. Cl. .................................................. 370/60
[58] Field of Search ............................. 370/60, 94, 58; 179/18 ES

[56] References Cited

U.S. PATENT DOCUMENTS

| 3,732,548 | 5/1973 | Howells et al. | 179/18 ES |
| 3,988,545 | 10/1976 | Kuemmerle et al. | 370/99 |
| 4,413,337 | 11/1983 | Dauphin et al. | 370/94 |
| 4,494,231 | 1/1985 | Slawy et al. | 370/60 |

OTHER PUBLICATIONS

Review of the Electrical Communication Laboratories, vol. 28, Numbers 5-6, May-Jun., pp. 328-337, published by Musashino Electrical Communication Laboratory of Nippon Telegraph & Telephone Public Corporation.
Naecon 1981; Proceedings of the IEEE; "A Distributed Processing Architecture for Voice/Data Switching"; Ross et al.; May 19-21, 1981; pp. 350-6 to 356.

Primary Examiner—Douglas W. Olms
Assistant Examiner—Frank M. Scutch, III
Attorney, Agent, or Firm—Townsend & Townsend

[57] ABSTRACT

A hierarchical message channel storage of a digital switching system which is connected to time division multiplex transmission lines includes at least a small-capacity high-speed memory and a large-capacity low-speed memory. A control section performs switching using the high-speed memory when a circuit switching call is received. However, when a packet switching call is received, the control section accesses the high-speed memory to temporarily store transmission data in the high-speed memory and performs switching for one of the output transmission lines or the control section accesses the high- and low-speed memories to temporarily store data in the low-speed memory through said high-speed memory so as to perform switching for one of said output transmission lines. In this case, the access cycles of the high-speed memory have circuit/packet switching call cycles and switching program cycles. A single storage is commonly used for the circuit switching call requiring writing data at a high speed, the packet switching call requiring storing a great amount of data, and the switching program.

10 Claims, 16 Drawing Figures

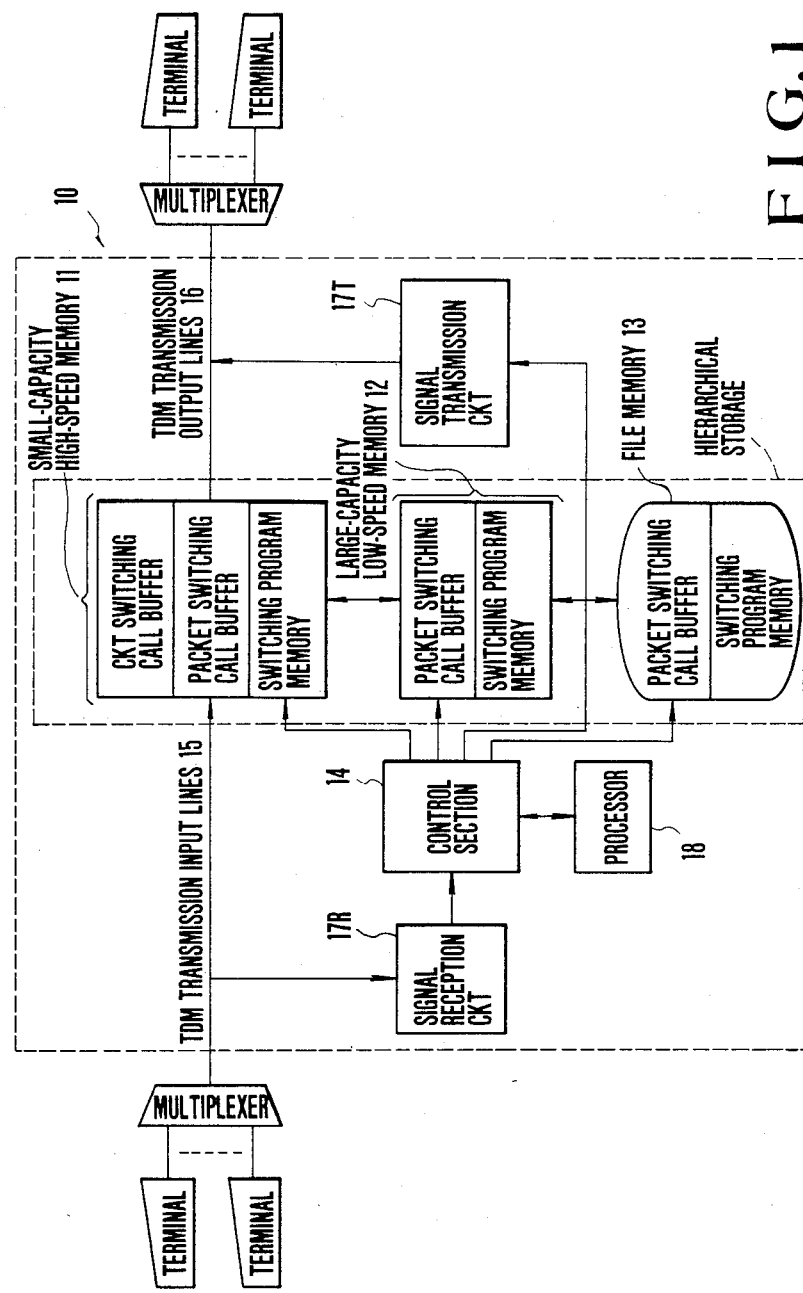

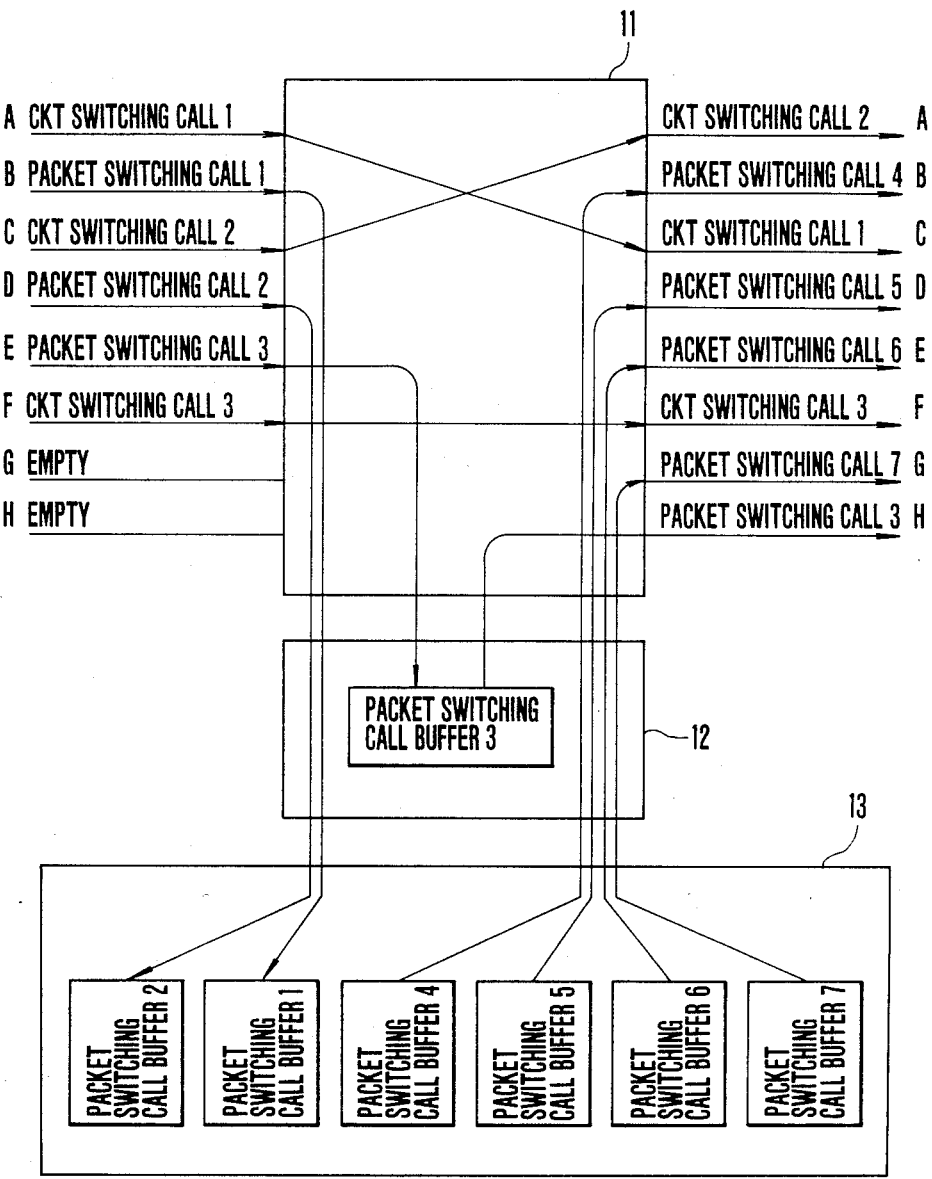
F I G. 5

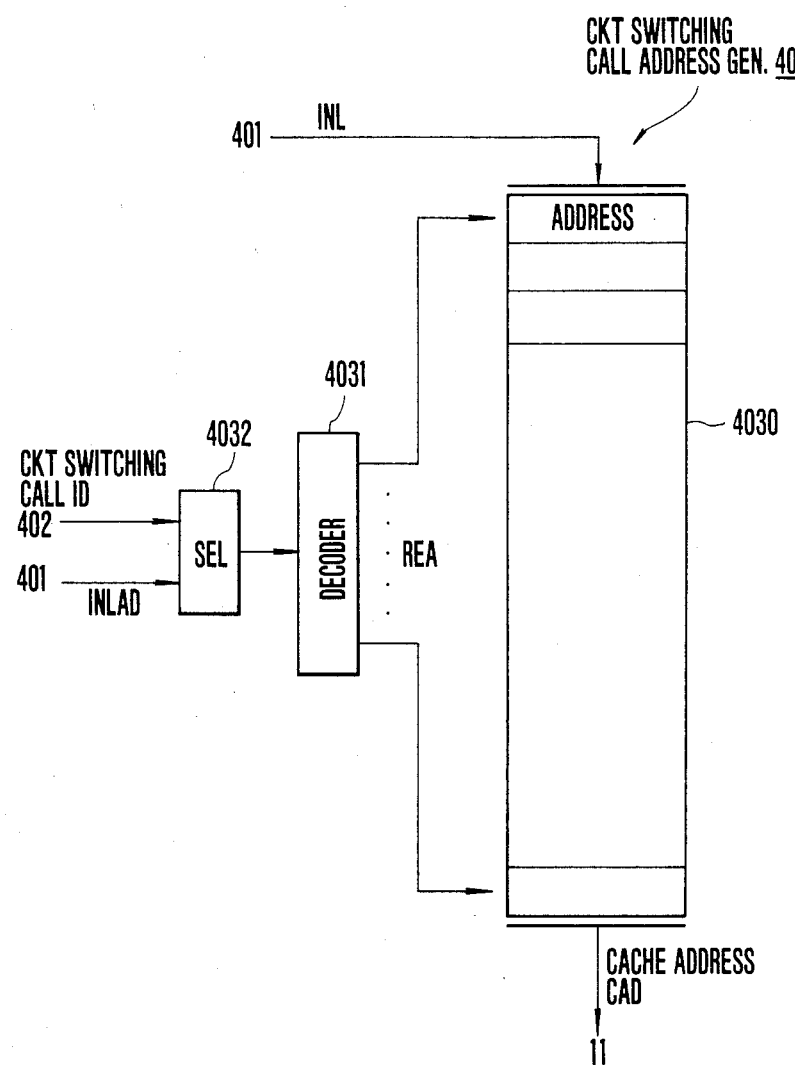
F I G. 11

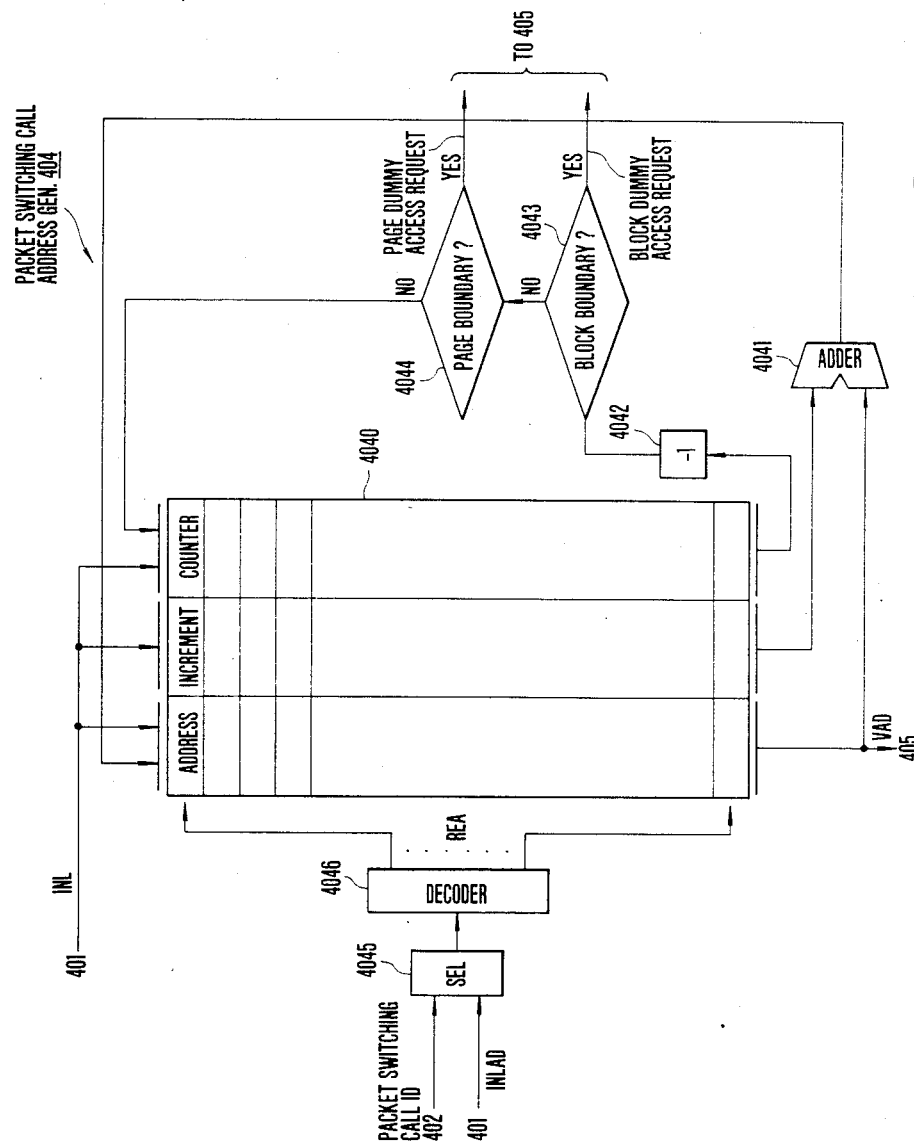
F I G. 12

DIGITAL SWITCHING SYSTEM

BACKGROUND OF THE INVENTION

The present invention relates to a digital switching system.

Various types of switching systems have been proposed to perform circuit switching. In these systems, circuit switching is performed in response to service demand and a transparent transmission line is assured while the service demand call is set. Therefore, various types of implementation have been utilized in digital switching systems of circuit switching call type to transmit a great amount of data with the shortest possible predetermined transmission delay. In general, a small-capacity high-speed memory is used in a switching network section of such a system. A typical example is described in "Digital Data Switching Network", T. Arita et al., Vol. 28, Nos. 5–6, PP. 328–337, 1980, Nippon Telegraph and Telephone Public Corporation Musashino Electrical Communication Laboratory.

Along with the recent development of new data transmission systems such as telex and teletex, a switching system is developed to effectively use the transmission line when the density of transmission data is low. In this system, a message is broken up into smaller segments or packets for transmission onto the line in a packet switching network. This packet switching system is an example of a store-and-forward system, so that a message channel must have a large storage capacity. Conventionally, in order to perform packet switching as well in a circuit switching system, a packet switching system must be arranged together with the circuit switching system. However, when different systems (i.e., a circuit switching system and a message or store-and-forward system such as a packet switching system) are used, the number of component parts is increased, resulting in high cost. In addition, when the traffic condition changes, the available service is confined to the limit of each system. A total switching system having different types of system cannot thus provide flexible operations.

SUMMARY OF THE INVENTION

It is, therefore, a principal object of the present invention to provide a single digital switching system capable of effectively performing different types of calls.

It is another object of the present invention to provide a simple digital switching system having a smaller number of components in a switching network than that of the conventional network.

It is still another object of the present invention to provide a digital switching system capable of performing flexible service in accordance with the traffic state.

In order to achieve the above objects of the present invention, a hierarchical storage having a small-capacity high-speed memory, a large-capacity low-speed memory and a file memory is used as a message channel memory (normally it is called a speech path memory). The access cycle of the high-speed memory is divided into a write/read cycle of circuit and packet switching call data and a cycle of a switching program. In this manner, a single memory system or storage system can be commonly used for the circuit switching call requiring high-speed data write/read access, the packet switching call requiring the storage of a great amount of data, and the switching program. Therefore, according to an aspect of the present invention, there is provided a digital switching system comprising:

a hierarchical storage connected to input and output transmission lines serving as time division multiplex transmission lines, and a control section for controlling an operation of the hierarchical storage, the hierarchical storage including at least a small-capacity high-speed memory and a large-capacity low-speed memory, the control section being arranged such that the high-speed memory is accessed to immediately perform switching for one of the output transmission lines when states of the input transmission lines indicate a circuit switching call, and that the high-speed memory is accessed to temporarily store data in the high-speed memory and the stored data in the high-speed memory is sent out to one of said output transmission lines, or the high- and low-speed memories are accessed to store data in the low-speed memory through the high-speed memory so as to perform switching for one of the output transmission lines when the states of the input transmission lines indicate a packet switching call.

BRIEF DESCRIPTION OF THE DRAWINGS

FIG. 1 is a block diagram showing the basic system configuration of a digital switching system according to the present invention;

FIG. 2 is a diagram showing a signal format used in the system shown in FIG. 1;

FIG. 5 is a diagram showing the state of the memory used in accordance with the circuit or packet switching call;

FIG. 11 is a block diagram of a circuit switching call address generator shown in FIG. 6;

FIG. 12 is a block diagram of a packet switching call address generator shown in FIG. 6;

DESCRIPTION OF THE EMBODIMENT

Figure 3:
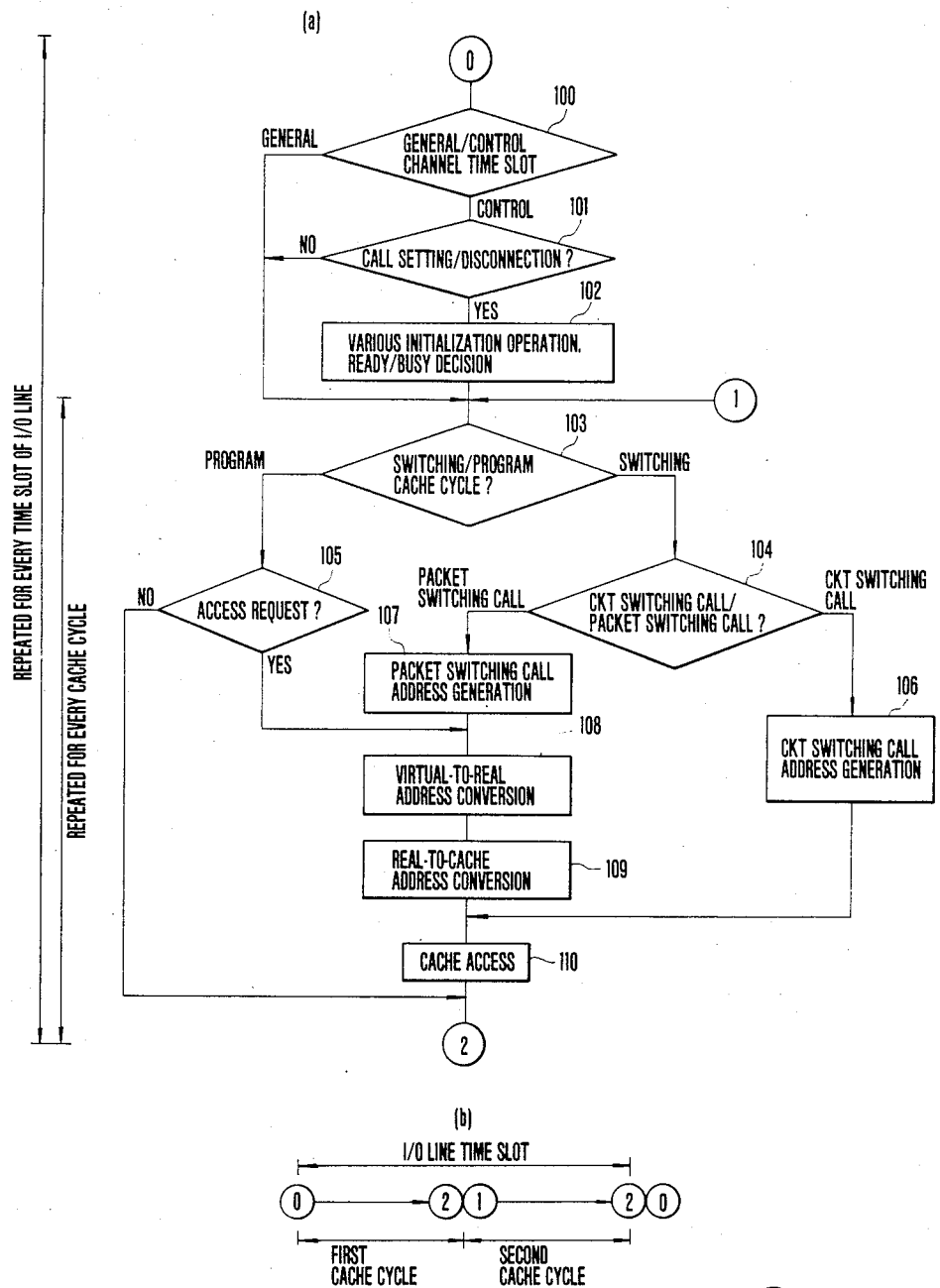
FIG. 3 shows a flow chart and a time slot for explaining the basic operation of the system shown in FIG. 1.

A digital switching system according to an embodiment of the present invention will be described with reference to the accompanying drawings. The circuit switching call and the store-and-forward switching call (packet switching call) will be defined as follows.

The circuit switching call here represents a call requesting switching service in a conventional circuit switching mode. In this switching network, when the circuit switching call is set, a transparent transmission line is so assigned that the transmission delay is constant. The circuit switching system is suitable for transmitting a great amount of data.

On the other hand, the store-and-forward switching call or message switching call here represents a call requesting switching service in a packet switching mode and is referred to as the packet switching call. In this switching network, since temporary storage of data within the network is required the transmission delay is not constant. However, the packet switching system can be suitable for sophisticated communication operations such as error control and communication between terminals having different bit rates. In addition, since the resource to be held is not present throughout the packet switching period, the packet switching call is suitable for low-density traffic communication.

FIG. 1 shows a digital switching system according to an embodiment of the present invention. Referring to FIG. 1, a digital switching system 10 includes a small-capacity high-speed memory 11 called a cache, a large-capacity low-speed memory 12 and a file memory 13. The memories 11, 12 and 13 constitute a hierarchical storage. The small-capacity high-speed memory 11 switches circuit and packet switching calls supplied through TDM (time division multiplex) input and output lines 15 and 16 and causes the switching program to run. The small-capacity high-speed memory 11 includes a circuit switching call buffer, a packet switching call buffer and a switching program memory. The large-capacity low-speed memory 12 includes a packet switching call buffer and a switching program memory. The file memory 13 includes a packet switching call buffer and a switching program memory.

Switching program execution can be performed such that instructions stored in the small-capacity high-speed memory 11 are read out and processed by a processor. When required information (instructions or data) is not stored in the small-capacity high-speed memory 11, a data block including nucleus data is fetched from the large-capacity low-speed memory 12 and is stored in the small-capacity high-speed memory 11 so as to perform subsequent processing, as in a general computer system having a cache. However, when the desired data is not stored in the large-capacity low-speed memory 12 either, the data is transferred from the file memory 13 to the large-capacity low-speed memory 12, and the desired block is read out from the memory 12 and transferred to the low-capacity high-speed memory 11 so as to perform subsequent application.

Furthermore, the digital switching system 10 has: a signal reception circuit 17R for receiving a signal supplied from a terminal through a multiplexer and the input lines 15 and producing a switching control or forward signal; and a control section 14 for controlling the small-capacity high-speed memory 11, the large-capacity low-speed memory 12, the file memory 13 and a signal transmission circuit 17T in response to the switching control signal supplied from the signal reception circuit 17R under the control of a processor 18.

In the above system configuration, when a call is transmitted from the multiplexer to a predetermined time slot of the input lines 15 as the TDM transmission lines shown in FIG. 1, the digital switching system 10 extracts control data from the common control channel signal received through the signal reception circuit 17R. The control section 14 performs switching or program execution in response to the control signal under the control of the processor 18.

The format of the common channel signal in this embodiment is illustrated in FIG. 2. A service indicator A discriminates between a circuit switching call and a packet switching call. The calling party specifies the call mode at the sending terminal. A terminal indicator B following the service indicator A discriminates the type of terminal in the circuit or packet switching call mode. The terminals include facsimile, telex and teletex systems. A signal indicator C follows the terminal indicator B. The signal indicator C includes supervisory signals such as an originating signal, a disconnect signal and an off-hook signal. A rate indicator D follows the signal indicator C. The rate indicator D includes transmission rate data and discriminates a given transmission rate such as 300 baud or 1,200 baud. A selection data E follows the rate indicator D. The selection data E includes a dialing signal or a signal corresponding thereto.

This signal format excluding the service indicator A is commonly used as the transmission format on a TDM transmission line. The control signal having the signal format described above is supplied to the control section 14 through the signal reception circuit 17R and is translated thereby. The translation hardware can be arranged wherein a decoder function for decoding the service indicator codes is added to a conventional signal processor (usually having functions such as synchronization control, error control, address signal processing and dialing/on-hook signal processing).

The basic access operation of the control section 14 upon reception of the control signal with respect to the high-speed memory or cache 11 will be described with reference to FIGS. 3 and 4 in the case of operations for the circuit switching call, the packet switching call and switching program execution.

Figure 4:
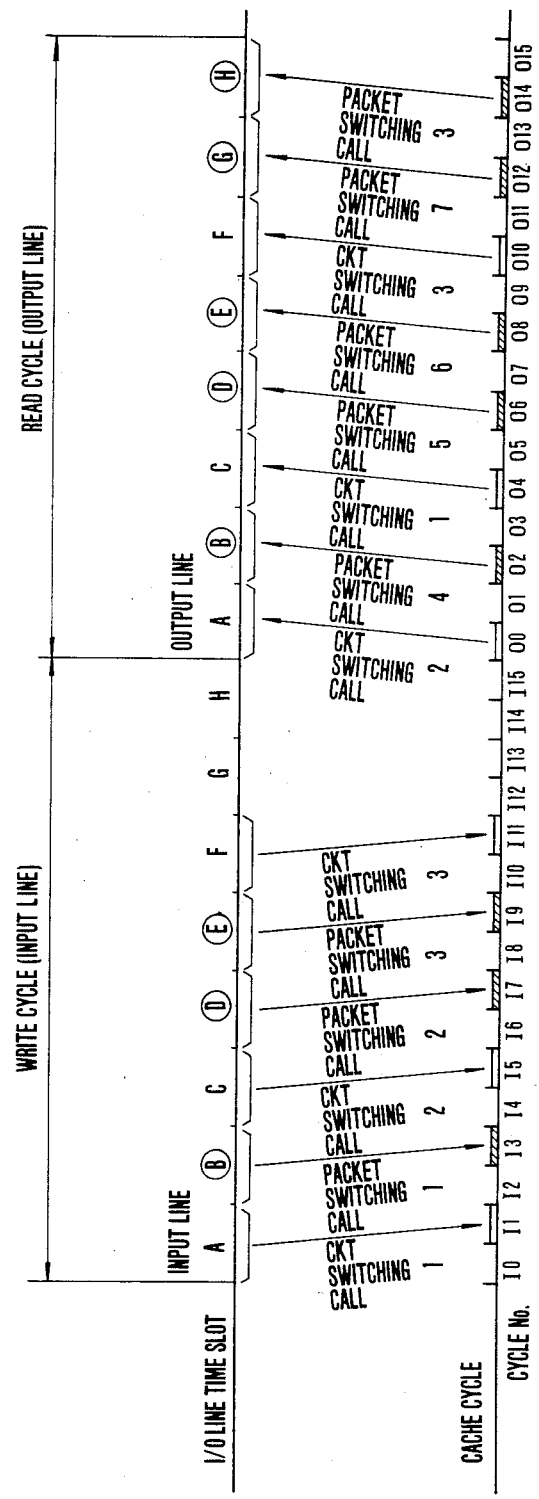
FIG. 4 is a diagram showing the relationship between the cache cycles and I/O (input/output) multiplexing line time slots corresponding to the circuit and packet switching calls so as to explain the operation in association with FIG. 3.

The cache cycles in this embodiment are clearly illustrated in FIG. 4. The control signal on the common signalling control channel is omitted in FIG. 4, and only the signal data is illustrated therein. Referring to FIG. 4, two cache access cycles correspond to one time slot of the I/O line. One cache access cycle is used for switching (circuit or packet), and the other cache access cycle is used for program execution. When there is an empty switching cycle and a program access request, the switching cycle can be used for program execution. As shown in FIG. 3, this is obtained upon execution of step 103 for determining whether the given cache cycle is a switching cycle or a program cycle and step 105 for determining whether or not an access request is generated from the processor when the given cache cycle is detected as the program execution cycle. It should be noted that as an application example three or more than three cache cycles can correspond to one time slot of the I/O line. The content of each cache cycle is determined in step 104 to decide whether a given cache cycle indicates the circuit or packet switching call when the given cache cycle is detected as the switching cycle in step 103.

When the switching cycle indicates the circuit switching call, a circuit switching call address is generated in step 106, and a cache access is immediately performed in step 110. However, when the switching cycle indicates the packet switching call, a packet switching call address is generated in step 107, a virtual address is converted to a real address in step 108, and the real address is converted to a cache address in step 109. Thereafter, the cache access operation is performed in step 110. However, when the cache cycle is detected in step 103 to be a program execution cycle and the access request is detected in step 105 to be generated by the processor, steps 108, 109 and 110 are performed in the same manner as the packet switching call, except for step 107 for generating the packet switching call address.

When a call is set or disconnected, the common control signal channel detects its request. The processor 18 checks whether or not any time slot is assigned to the control channel. Various initialization operations and the decision of ready/busy must be performed. For this purpose, steps 100, 101 and 102 are performed. More particularly, the processor 18 checks in step 100 whether the data supplied to each time slot of the input lines 15 through the control section 14 is general data or a control signal. When the data is discriminated in step 100 to be the general data, the flow advances to step 103. The processor 18 then checks in step 103 whether the cache cycle is the switching cycle or the program cycle. However, when the processor 18 detects that the data is the control signal in step 100, the flow advances to step 101. The processor 18 checks in step 101 whether the control signal includes call setting information or call disconnection information. If the processor 18 detects that no information is contained in the control signal (i.e., if NO in step 101), the flow advances to step 103. However, if YES in step 101, the flow advances to step 102 wherein various initialization operations and the decision of ready/busy are performed. The flow then advances to step 103. Steps 103 to 110 are performed as described above. It should be noted that steps 100 to 110 are performed for every time slot of each input line, and that steps 103 to 110 are performed for every cache cycle.

In the processing of FIG. 3, when steps 103 to 110 cannot be performed within a single cache cycle due to the processing speed and the specifications of component parts, hardware for performing the respective steps may be controlled in a pipeline manner. In this case, the actual cache access is performed when a two or more than two cache cycle period has elapsed. In this embodiment, pipeline control is not performed for the purpose of simplicity. However, a pipeline system can be easily arranged by using various types of buffers. In this embodiment, the virtual storage system is employed. However, the configuration of this embodiment can be easily performed in accordance with the conventional file management system instead of the virtual storage system. In this case, step 108 can be omitted in FIG. 3, and step 102 must be modified.

FIG. 3B indicates the operation sequence wherein an input/output line time slot corresponds to two cache cycles. Operations 0 to 2 are performed during the first cache cycle, and operations 1 to 2 are performed during the second cache cycle. Steps 100 to 102 are performed simultaneously with step 103 and subsequent steps.

Referring to the cache cycle slots shown in FIG. 4, white boxes represent circuit switching call slots, hatched boxes represent packet switching call slots, empty boxes represent program or empty (read/write (R/W) operation through TDMA line can be performed) slots, respectively.

FIG. 5 is a diagram showing the state of use of the input/output time slots in correspondence with the state of use of input and output lines in accordance with the circuit and packet switching calls. In a circuit switching call 1 in FIGS. 4 and 5, data to be switched is fetched from an input line A in the cache 11 during a cache cycle I1. The data is read out from the cache 11 to an output line C during a cache cycle 04. In a packet switching call 1, data to be switched is fetched from an input line B to the cache 11 during a cache cycle I3 and is stored in the packet switching call 1 buffer in the file memory 13 through the large-capacity low-speed memory (to be referred to as a main memory hereinafter) 12. The data (to be switched) of a circuit switching call 2 is stored from the input line C to the cache 11 during a cache cycle I5 and is read out from the cache 11 to the output line A during the cache cycle O0. A packet switching call 2 is written as data (to be switched) from an input line D to the cache 11 during a cache cycle I7 and is stored in the packet switching call 2 buffer in the file memory 13 through the main memory 12. In a packet switching call 3, data to be switched is written from an input line E to the cache 11 during a cache cycle I9 and is stored in the packet switching call 3 buffer through the main memory 12. The packet switching call 3 represents short-period store-and-forward switching. The stored data are read out from a corresponding buffer onto an output line H during a cache cycle O14 while the corresponding buffer stores the input data. The respective operations of the parts of the digital switching system 10 will be described in detail below.

Figure 6:
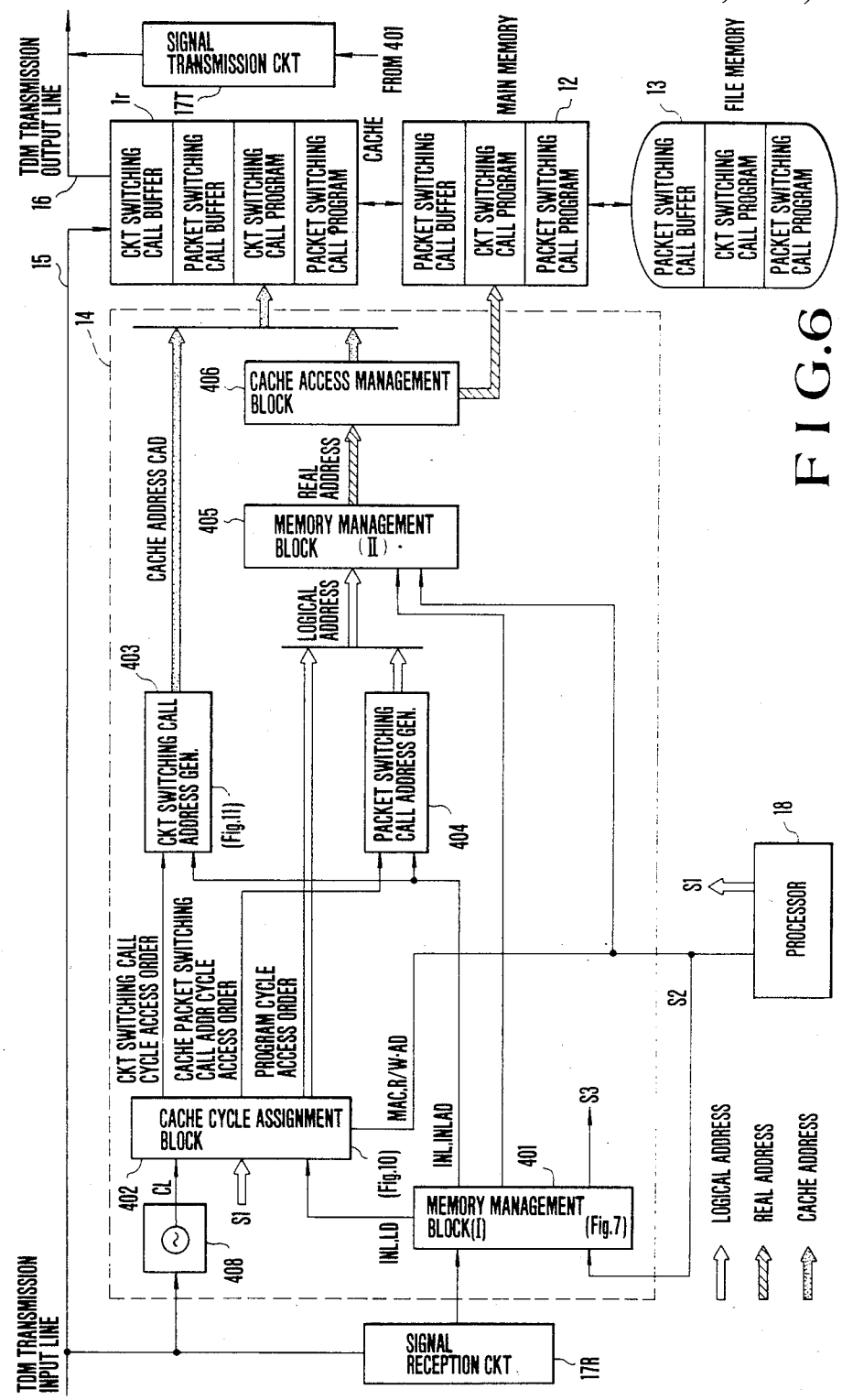
FIG. 6 is a block diagram showing the detailed functions of a control section (FIG. 1) and its peripheral arrangement.

FIG. 6 is a functional block diagram of the control section 14 shown in FIG. 1. Referring to FIG. 6, a memory management block (I) 401 performs operations corresponding to steps 100 to 102 of FIG. 3. A cache cycle assignment block 402 performs operations corresponding to steps 103 to 105 of FIG. 3. A circuit switching call address generator 403 performs an operation corresponding to step 106 of FIG. 3. A packet switching call address generator 404 performs an operation corresponding to step 107 of FIG. 3. A memory management block (II) 405 performs an operation corresponding to step 108 of FIG. 3. Finally, a cache access management block 406 performs an operation corresponding to step 109 of FIG. 3. The memory management block (I) 401 and the memory management block (II) 405 must be controlled by the processor 18. The program memory access request under the control of the processor 18 is performed through the cache cycle assignment block 402 during a time interval corresponding to the program time slots (FIG. 4) between the circuit and packet switching call slots.

A signal S1 from the processor 18 represents processor memory access, a signal S2 represents various pieces of control information, and a signal S3 from the memory management block (I) 401 represents the ready/busy signal. As shown in FIG. 6, a hollow arrow indicates a virtual address, a hatched arrow indicates a real address, and a dotted arrow indicates a cache address.

As described above, the memory management block (I) 401 performs the operations corresponding to steps 100 to 102 of FIG. 3A. The memory management block (I) 401 receives the initialization control signal S1 from the processor 18 and a call/disconnection request from the signal reception circuit 17R. Upon reception of the call/disconnection request, the memory management block (I) 401 performs the operation corresponding to step 102 of FIG. 3A and supplies a ready/busy signal to the signal transmission circuit 17T. At the same time, the memory management block (I) 401 supplies an initialization control signal and the circuit control data to the cache cycle assignment block 402, the initialization control signal to the circuit switching call address generator 403 and the packet switching call address generator 404, and a memory management table updating signal to the memory management block (II) 405.

Figure 7:
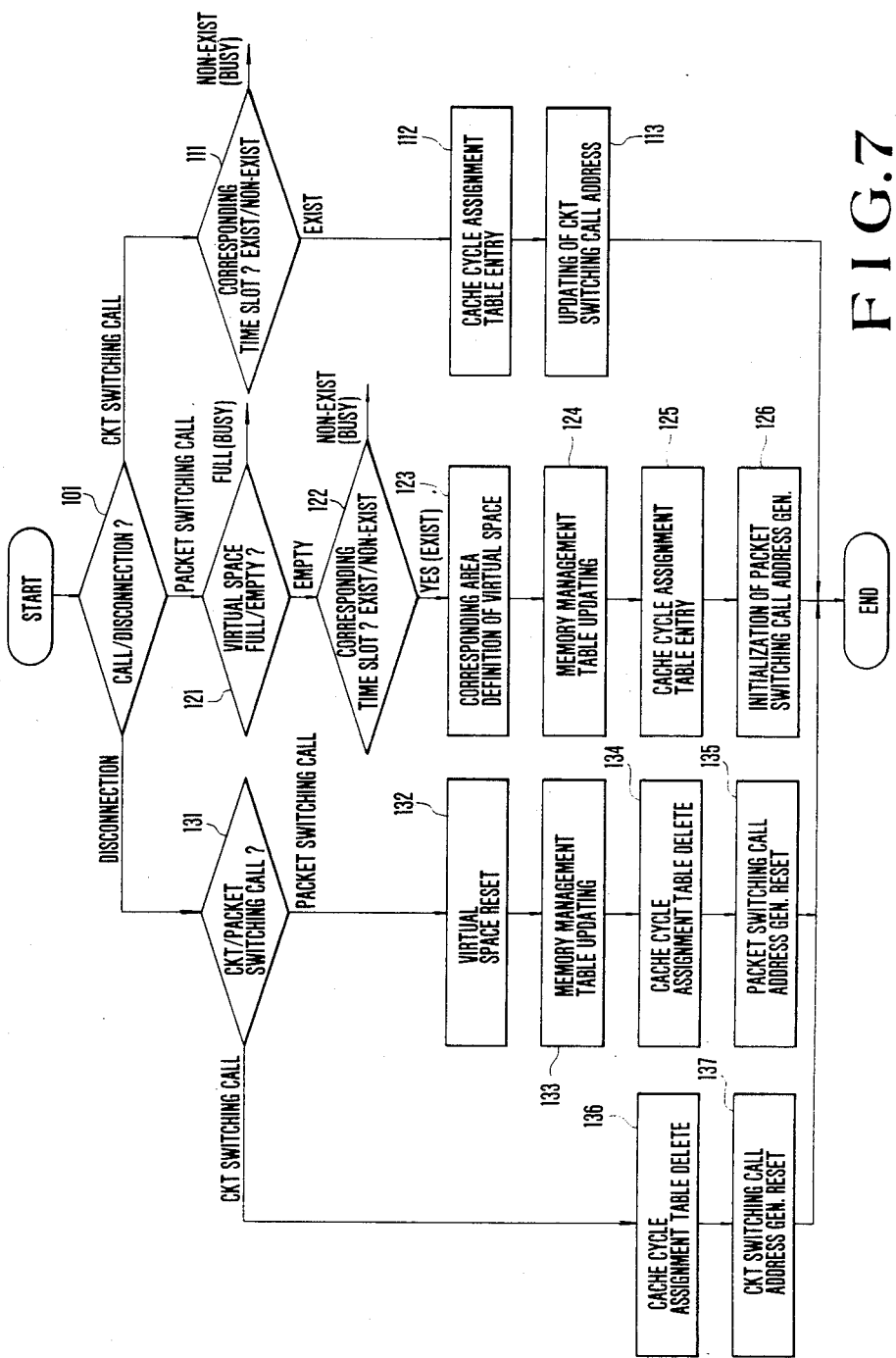
FIG. 7 is a flow chart for explaining the operation of a memory management block (I) shown in FIG. 6.

FIG. 7 is a flow chart for explaining the operations in association with a call/disconnection operation by the memory management block (I) 401 of FIG. 6.

The functions of the memory management block (I) 401 are: (A) assignment of the corresponding call area to the virtual address space in association with the circuit switching call, the packet switching call, or their disconnection, and the resetting of this assignment; (B) the loading and unloading of a program and data with respect to the virtual address space, upon request by the processor 18; (C) the management of memory area and cache cycle in association with functions (A) and (B) above; (D) the sending of table update data in the cache cycle assignment block 402 in association with function (C); (E) the sending of table update data in the circuit switching call address generator 403 in association with function (C); and (F) initialization of the circuit and packet switching call address generators 403 and 404 in association with function (C). All these functions, except for function (B), are provided only in the present invention.

Referring to FIG. 7, the memory management block (I) 401 checks in step 101 whether the call mode or the disconnection mode is set.

In step 111, the memory management block (1) 401 then checks whether or not the corresponding time slot is present. If NO in step 111, the block (I) 401 supplies a busy signal to the signal transmission circuit 17T. However, if YES in step 111, the flow advances to step 112. A cache cycle assignment table entry updating signal is supplied to a cache cycle assignment table 4020 (FIG. 10) of the cache cycle assignment block 402. Subsequently, in step 113, a circuit switching address access signal is supplied to the circuit switching call address generator 403, thereby updating the content in accordance with the address signal.

On the other hand, if the packet switching call is set, the memory management block (I) 401 checks in step 121 whether or not the virtual space has an available room to spare. However, if it is detected that the virtual space is full, the busy signal is supplied to the signal transmission circuit 17T. If an empty portion is present in the virtual space, the block (I) 401 checks in step 122 whether or not the corresponding time slot exists. If NO in step 122, the block (I) 401 supplies a busy signal to the circuit 17T, as in the case of NO in step 111. However, if YES in step 122, the corresponding call area is defined in the virtual space in step 123. Subsequently, the memory management table incorporated in the memory management block (I) 401 is updated and control signal data required for initialization are entered. For example, the control signal data include data indicating the number of time slots to be assured on the transmission line and time slot numbers in addition to a service indicator, a terminal indicator, and a signal indicator, etc. Subsequently, in step 125, cache cycle assignment table processing (the same as in step 112) is performed. The block (I) 401 supplies the initialization data signals, initialization address signals and so on to the packet switching call address generator 404 so as to perform various initialization operations in step 126. It should be noted that steps 123 to 126 need not be performed in the order named but may be performed simultaneously.

If a call disconnection request is detected in step 101, it is checked in step 131 whether the call is the circuit or packet switching call. When the block (I) 401 detects that the call is the circuit switching call, the flow advances to step 136 wherein the data concerning the circuit switching call are deleted from the cache cycle assignment table in the cache cycle assignment block 402. In step 137, the initialization data of the circuit switching call address generator 403 are cleared. However, if it is detected in step 131 that the call is the packet switching call, the virtual space defined in step 123 is reset in step 132. The memory management table in the memory management block (I) 401 is updated in step 133. Furthermore, the corresponding data of the cache cycle assignment table in the cache cycle assignment block 402 is cleared in step 134. In step 135, the preset data in the packet switching call address generator 404 are cleared. It should be noted that the above operation can be performed by a program executed by the virtual memory management under the control of the processor 18.

The cache cycle assignment block 402 receives the memory access control signal S1 from the processor 18 in response to an output timing pulse (i.e., clock pulse) generated from a clock pulse generator 408 which is operated by extracting the synchronizing signal from the signal on the time slot of the TDM transmission line. When the memory access is for a program access, a program cycle access order is supplied to the memory management block (II) 405. However, when the memory access is for a switching access, the cache cycle assignment block 402 receives circuit (or line) control data LD from the memory management block (I) 401 so as to check the content of the circuit/packet switching call request. When it is detected that the request is the circuit switching call, a circuit switching call cycle access order is supplied to the circuit switching call address generator 403. However, when it is detected that the request is the packet switching call, a packet switching call cycle access order is supplied to the packet switching call address generator 404. The circuit switching address generator 403 then supplies a cache address as a real address signal to the cache memory 11 so as to directly access the cache memory 11, and the packet switching call address generator 404 supplies a virtual address of packet switching data to the memory management block (II) 405.

Figure 8:
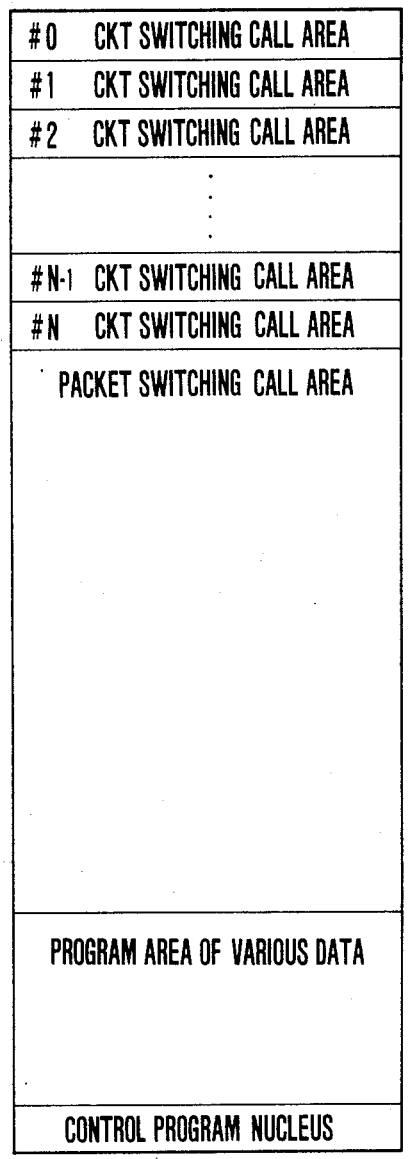
FIG. 8 is a diagram showing a system address space.

FIG. 8 shows a system space of the file memory 13 used in this embodiment.

The system address space (i.e., virtual space) is assigned with the #0 to #N circuit switching call areas, packet switching call areas following the #0 to #N circuit switching call areas, areas of various data, programs and a control program nucleus for a control program such as an operating system.

Figure 9:
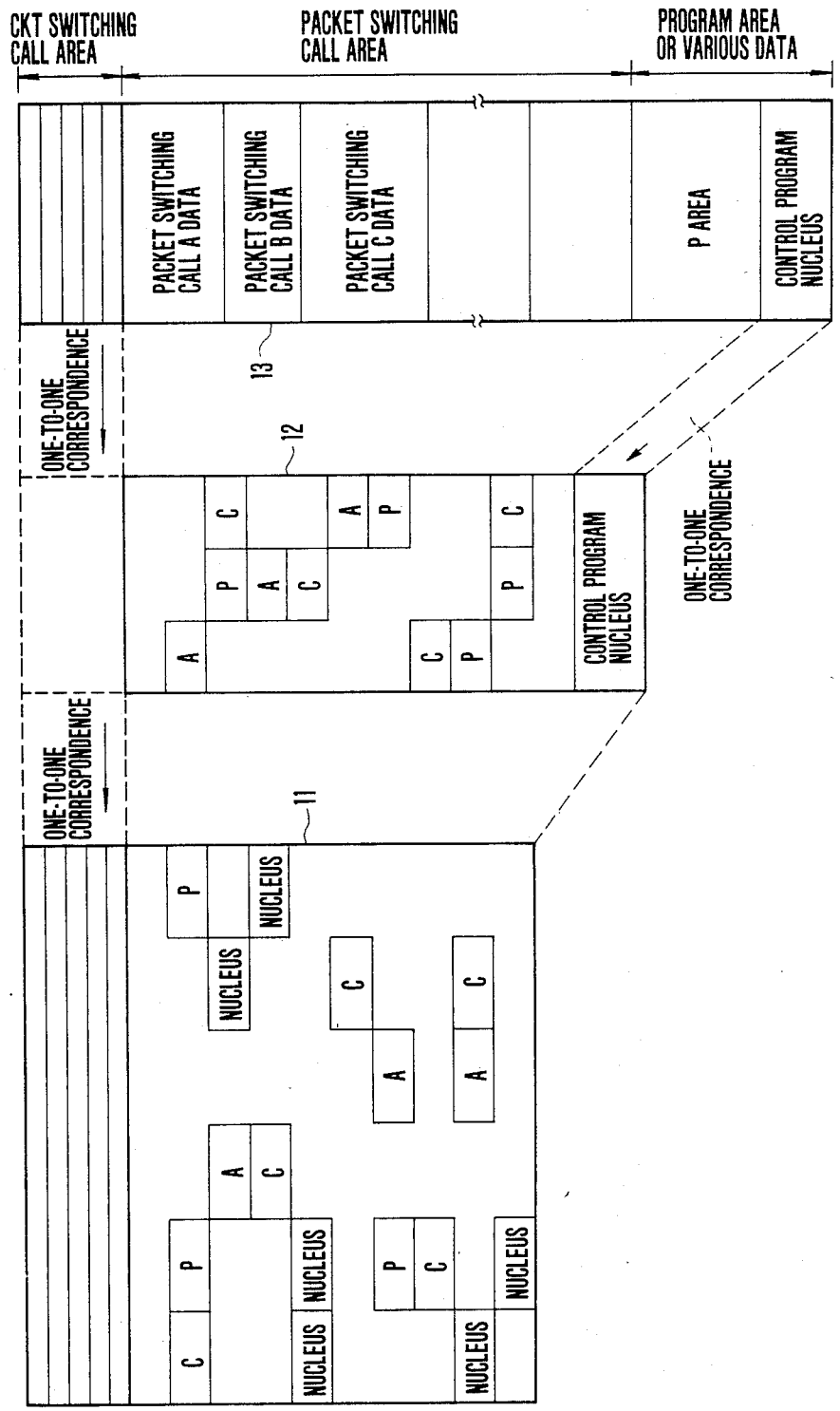
FIG. 9 is a diagram showing the correspondence between a cache memory, a main memory and the system address space.

FIG. 9 shows the correspondence among the cache memory, the main memory and the file memory 13 of the system address space.

Referring to FIG. 9, the circuit switching area addresses correspond one-to-one to the system addresses, thereby performing high-speed cache access. On the other hand, the packet switching call area is divided into data areas A, B, C, ... and has a format in accordance with the segment page system or the like so as to map the virtual address space (system address space) with the real address space (main memory). The packet switching call area also has a format in accordance with the set associative system so as to map the real address (main memory) with the cache address (cache memory).

Figure 10:
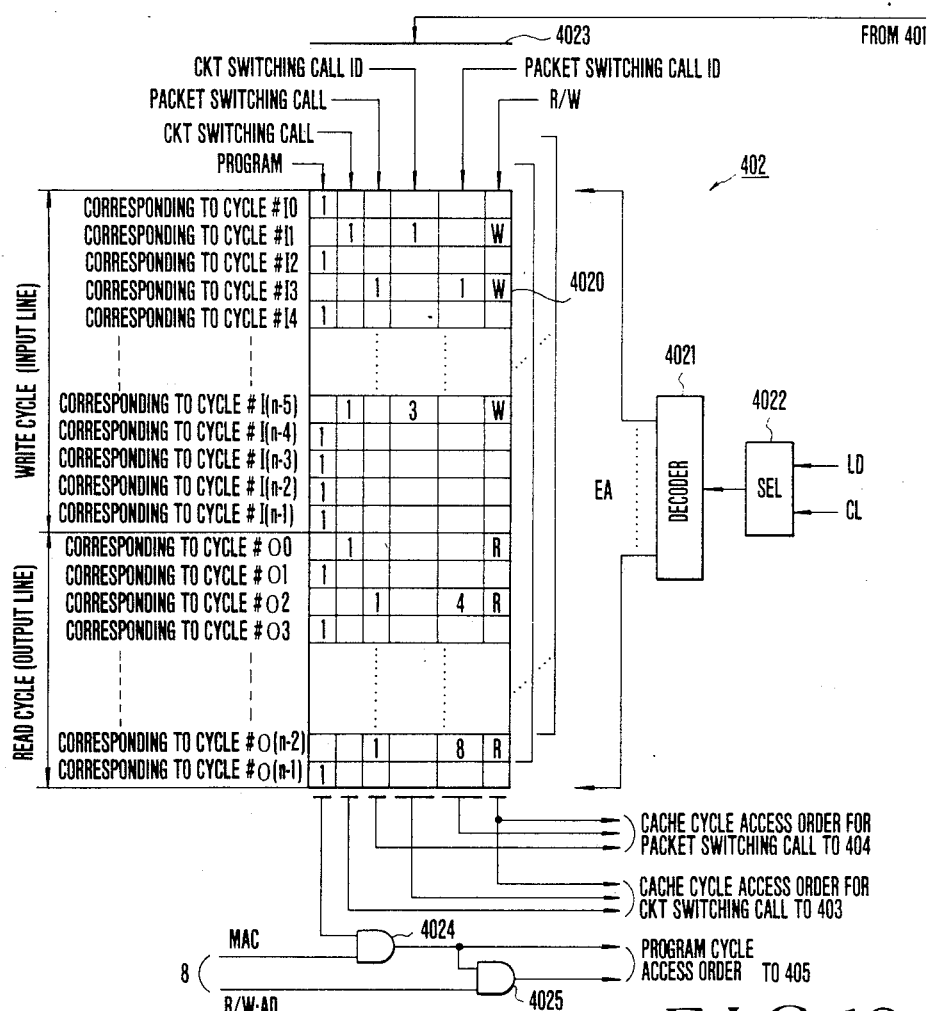
FIG. 10 is a block diagram of a cache cycle assignment block snown in FIG. 6.

FIG. 10 shows a detailed arrangement of the cache cycle assignment block 402 shown in FIG. 6. The block 402 is mainly featured with a register array 4020 having entry data corresponding to the respective cache cycles.

When a clock pulse from the clock pulse generator 408 is received by the cache cycle assignment block 402, the line control data LD from the memory management block (I) 401 is fetched in a decoder 4021 through a selector 4022. The decoder 4021 generates an entry address EA. The cache cycle assignment block 402 then assigns the corresponding cache cycle to the circuit switching call, the packet switching call, or program execution in accordance with a combination of the entry data content and the access request presence/absence signal from the processor 18. The entry data includes a flag for discriminating the read/write operation, or the circuit/packet switching operation, or an empty cycle (indicating that the cycle can be used for program execution), and ID (identification) of the circuit/packet switching call. This ID is used as the entry address EA for the register array in the detailed arrangement of the circuit/packet switching call address generator 403 or 404, shown in FIG. 11 or 12. When the call is set or disconnected, the decoder 4021 responding to the line control data LD from the memory management block 401 generates the entry address EA corresponding to the circuit/packet switching call cycle used or to be used. The content of the entry address is updated in response to initialization data INL supplied from the memory management block 401.

A processor memory access request MAC is supplied from the processor 18 to an AND gate 4024. A read/write address R/W AD is supplied through an AND gate 4025. These inputs are respectively supplied as program cycle access orders to the memory management block (II) 405. Similarly, the cache cycle access order for packet switching call is supplied to the packet switching call address generator 404, and the cache cycle access order for circuit switching call is supplied to the circuit switching call address generator 403.

FIG. 11 shows the detailed arrangement of the circuit switching call address generator 403 shown in FIG. 6. When the circuit switching call identification ID is supplied to a decoder 4031 through a selector 4032, one of entries in a register array 4030 is selected. The corresponding circuit switching call cache address is stored in each entry. The initialization of the entry content is performed by the memory management block (I) 401. In other words, the initialization data INL from the memory management block (I) 401 is supplied to the circuit switching call address generator 403. At the same time, an initialization address INLAD is supplied to the decoder 4031 through the selector 4032, so that a register entry address REA is generated. The initialization data (cache address) INL is set at the entry address REA. A cache address CAD is supplied to the cache memory 11 at the time of access.

FIG. 12 shows the detailed arrangement of the packet switching call address generator 404 of FIG. 6. The packet switching call address generator 404 comprises a register array 4040 of which entry is selected in response to the packet switching call identification ID supplied to a decoder 4046 through a selector 4045. Each entry data has a corresponding packet switching call system address (virtual address), an increment value and a count value. The increment value is used to calculate the start address of data to be accessed in the next cycle and stored in the corresponding packet switching call area. The increment value is added by an adder 4041 to the address of the current entry for every access, and the sum is replaced with the old address and stored within the same entry of register array 4040. The count value serves to prevent a page fault during processing the packet switching call, or to prevent a cache hit error and an overrun/underrun of the packet switching call data. The count value is also used to supply an alarm to the memory management block (II) 405 in advance and to cause the memory management block (II) 405 to perform dummy access of the previous page or block.

For example, the counter counts up to a value smaller by several tens of words than the number of words stored in the register array 4040, and the page fault or cache hit error is detected when the access operation corresponding to the count of the counter is performed. For this purpose, the count is decremented by one (by a hardware block 4042) for every access. Thereafter, blocks 4043 and 4044 detect whether the boundary is a block boundary as the management unit within the cache or a page boundary. When the blocks 4043 and 4044 detect that the boundary is a block boundary, a block dummy access request is generated. However, when the blocks 4043 and 4044 detect that the boundary is a page boundary, a page dummy access request is supplied to the memory management block (II) 405 so as to perform dummy access. Meanwhile, the corresponding data are fetched.

The initialization operation of the register array 4040 of the packet switching address generator 404 is performed by the memory management block (I) 401. The initialization data INL is supplied from the memory management block (I) 401 to the register array 4040. The initialization address INLAD is supplied to the decoder 4046 through the selector 4045. The decoder 4046 generates the register entry address REA, so that the initialization data (cache address) INL is set at the entry address REA. The cache address CAD is supplied to the cache memory 11 at the time of access.

The memory management block (II) 405 has the blocks to realize following functions: (A) a block to realize a dynamic conversion of virtual address to real address by using segmentation, paging or the like; (B) a hardware block (buffers such as TLB (translation look aside buffer)) for high-speed address conversion; and (C) a prevention hardware block, against overrun/underrun being caused by a page fault or a cache hit error (by means of accessing the previous page, previous block and dummy access) for the packet switching call data. Function (C) is not proposed by the conventional virtual memory system and is a characteristic feature of the present invention. Functions (A) and (B) can be realized by conventional hardware/software techniques.

Figure 14A:
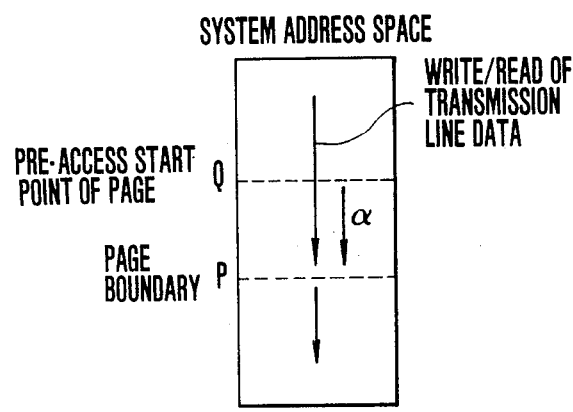
FIGS. 14A, 14B and 14C are respectively diagrams showing a section of a memory management block (II) which is a characteristic feature of the present invention.
Figure 14B:
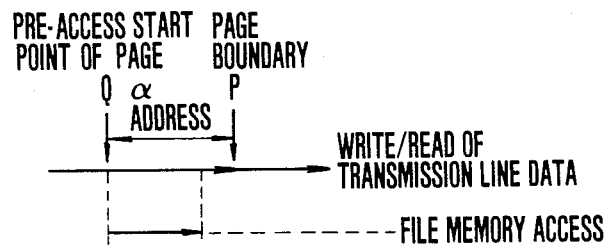

The memory management block (II) 405 will be described in detail. Conventionally, during the sequential read/write operation of the transmission data with respect to the system address space, this operation must be interrupted when the addresses have reached a page boundary since the corresponding page load from the file memory must be performed. For this reason, overrun/underrun inevitably occurs in the operation of writing or reading of the transmission line data. However, considering the way that transmission data sequentially access (read/write) the system address space, as shown in FIG. 14A, pre-access start point of the previous page at point Q at an address preceding by $\alpha$ addresses a page boundary address P can be set. As shown in FIG. 14B, data load from the file memory is started simultaneously with the write/read operation of the transmission data when the transmission data access period has passed the point Q, and loading is completed before the corresponding page is actually accessed. Therefore, even if the access time of the transmission data has reached the page boundary, access can be continued, thereby preventing interruption of write/read operation of the transmission line data. The hardware block for this operation is illustrated in FIG. 14C.

Figure 14C:
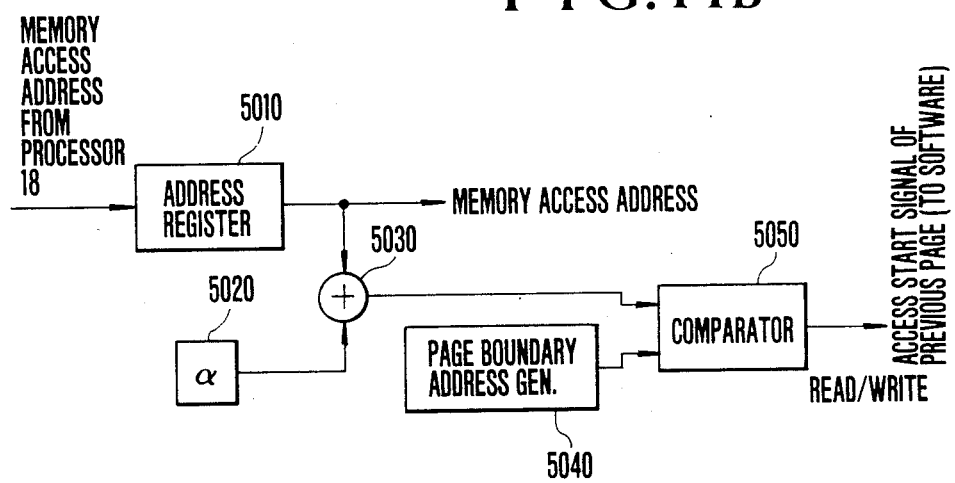

Referring to FIG. 14C, the block comprises an address register 5010 for holding a memory address from the processor 18 upon memory access, a register 5020 for holding the previous value of the previous access for comparison with the sequential access, the previous value being able to be arbitrarily preset by the system, an adder 5030, a register 5040 for holding a page boundary address value which indicates a page boundary within the cache, and a comparator 5050 for comparing a sum obtained by adding the sequential access address and the previous value held by the register 5020 with the boundary value held by the register 5040. Therefore, (content of the register 5010)+(content of the register 5020) is compared with the (content of the register 5040) by the comparator 5050 in the hardware block shown in FIG. 14C. When (memory access address)+$\alpha$=(page boundary address) is established, the previous page access start signal is generated to prevent in advance overrun/underrun of the transmission line data.

The cache access management block 406 has the following functions: (A) conversion of the main memory real address to the cache address (so as to realize the set associative system); (B) replacement algorithm (e.g., LRU (least recently used)) of cache blocks; and (C) fixing of the circuit switching call blocks within the cache by setting the replacement prevention flag. Function (C) is the feature of the present invention. Functions (A) and (B) can be constituted by a conventional computer system cache access management block.

Figure 13:
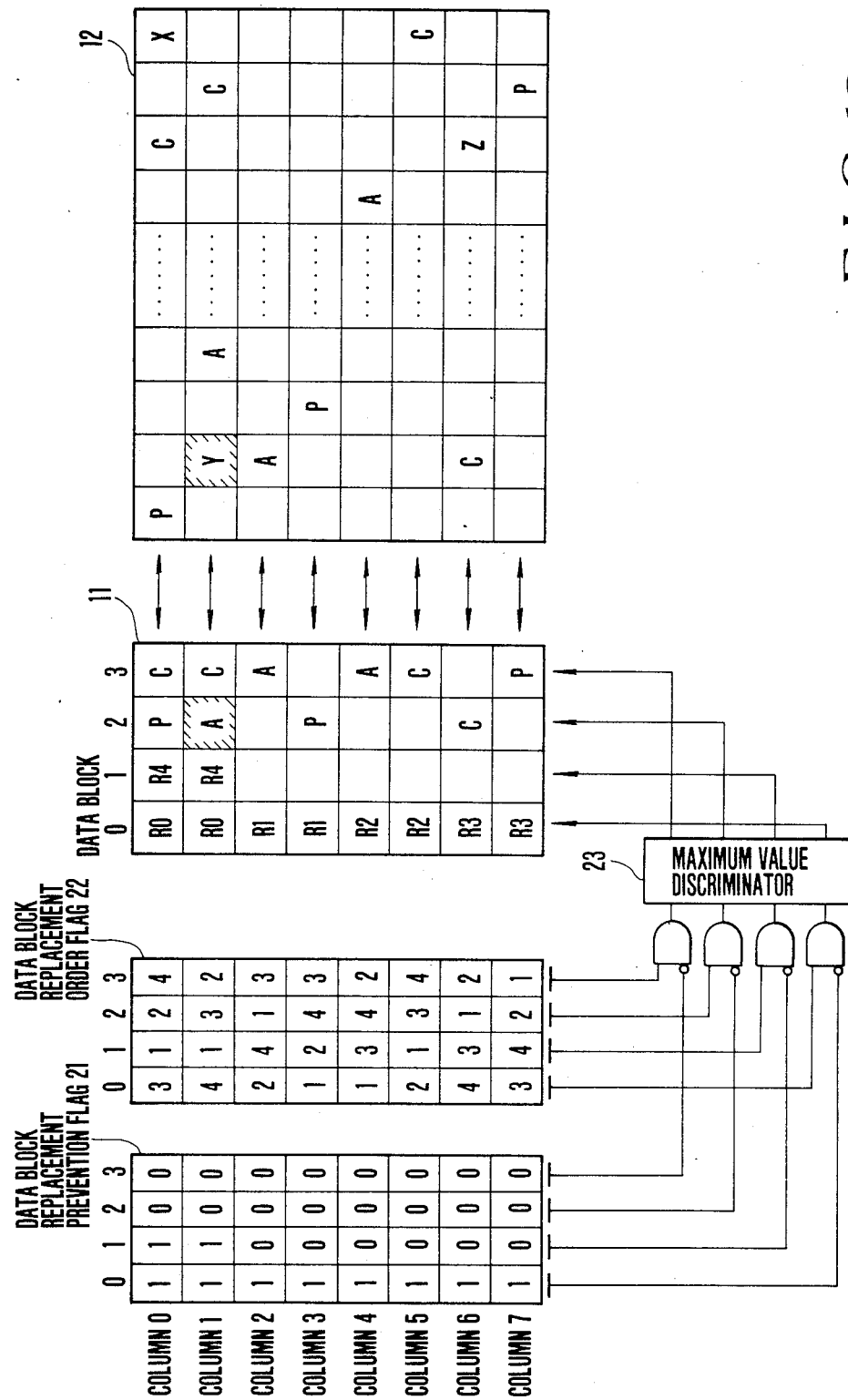
FIG. 13 is a diagram of an intra-cache fixing block of a circuit switching memory block.

FIG. 13 shows the detailed arrangement of the intra-cache fixing hardware block of the circuit switching call data block. Data block replacement prevention flags 21 are arranged to correspond to the respective blocks of the cache memory 11. These flags 21 are used together with block replacement order flags 22 for setting the block replacement algorithm. Even if the order flag is set to replace the circuit switching call data block, the prevention flag is used to set to replace the next order data block.

Referring to FIG. 13, as the replacement order flag of block 0 in column 1 is set to be "4", block 0 in column 1 is subjected to replacement since the block having the maximum value within a given column is subjected to replacement). However, since the block replacement prevention flag is set to be "1", data of "0" is supplied to a maximum value discriminator 23, so that block 2 having the order flag value of "3" is subjected to replacement. When a block within a portion "Y" (surrounded by hatched lines) in the main memory 12 is to be transferred, block 2 (which is used for packet switching call A surrounded by hatched lines) in the cache 11 is replaced in palce of block 0 (which is used for circuit switching call 0) in the cache 11. The cache access management block excluding the intra-cache fixing function is the same as the conventional cache access management block and can be obtained by the same hardware techniques as in a conventional cache access management block.

As shown in FIG. 13, R0 to R4 within the cache 11 are data blocks for circuit switching calls 0 to 4; and A and C are data blocks for packet switching calls A and C, respectively. The data block replacement order flag 22 is used to designate the replacement block having the maximum order value. On the other hand, the block replacement prevention flag 21 is set to "1" for blocks of replacement object. The replacement order flag and the replacement prevention flag are gated and compared by the maximum value discriminator 23. When a block with the replacement prevention flag 21 which is subjected to replacement owing to the corresponding maximum value of the block replacement order flag 22 is set to be "1", the block with the second highest order of the replacement order flag 22 of which block flag is not set to be "1" is selected to be replaced. However, when the block is set to be "0", the maximum value discriminator 23 supplies a block replacement designation signal to the cache memory 11. One of the signals is held ON.

The advantages of the present invention will be summarized as follows:

(I) The circuit and packet switching calls can be handled with a single set hardware components.

(II) The switching hardware can be configured without discriminating the message channel section from the control section.

(III) The ratio of circuit switching calls to packet switching calls can be arbitrarily selected by changing the address assignment.

(IV) Since the program memory is integrally formed with the message channel memory, maintenance applications such as service order entry, traffic monitoring, charging data transmission, file switching, patch entry can be easily performed through the transmission lines.

(V) Audio response trunks and various tone trunks can be substituted by using the voice tone patterns at the specific addresses of the memory. In addition, updating of the patterns can be easily performed.

(VI) A flexible network can be designed to satisfy every traffic state in accordance with advantages (I), (II) and (III).

(VII) Concentrated monitoring and maintenance can be performed from a remote place in accordance with advantages (IV) and (V).

In this embodiment, the hierarchical storage comprises the cache, the main memory and the file memory. However, the hierarchical storage is not limited to this arrangement.

According to the present invention as described above, the message channel memory is hierarchically arranged wherein the access cycles of the high-speed memory are commonly used for the circuit switching calls, the packet switching calls and program execution. Therefore, a single set of hardware components can be used to perform the circuit/packet switching calls. In addition, the hardware can be configured without discriminating the message channel section from the control section, thereby providing flexible service in accordance with a given traffic state. Since common components can be used, the number of components in the system can be decreased, resulting in low cost.

The present invention is not limited to the particular embodiment described above. Various changes and modifications may be made within the spirit and scope of the invention.

What is claimed is:

1. A digital switching system comprising:
    a hierarchical storage connected to a plurality of input and output transmission lines serving as time division multiplex transmission lines, and
    a control section for controlling an operation of said hierarchical storage,
    said hierarchical storage including at least a small-capacity high-speed memory and a large-capacity low-speed memory,
    said control section being arranged such that said high-speed memory is accessed to immediately perform switching for one of said output transmission lines when states of said input transmission lines indicate a circuit switching call, and that said high-speed memory is accessed to temporarily store data in said high-speed memory and the stored data in the high-speed memory is sent out to one of said output transmission lines, or said high- and low-speed memories are accessed to store data in said low-speed memory through said high-speed memory so as to perform switching for one of said output transmission lines when the states of said input transmission lines indicate a packet switching call.

2. A system according to claim 1, wherein said hierarchical storage further comprises a file memory for storing packet switching data corresponding to packet switching calls.

3. A system according to claim 1, wherein said hierarchical storage is commonly used for a switching program together with the circuit and packet switching calls.

4. A system according to claim 1, wherein the signals of the circuit and packet switching calls are transmitted on said time division multiplex transmission lines in accordance with a common signalling control system.

5. A system according to claim 1, wherein said high-speed memory has access cycles which comprise circuit or packet switching call cycles, and a switching program cycle, a single memory being commonly used in the circuit and packet switching call cycles and the switching program cycle.

6. A system according to claim 1, wherein said control section receives through a signal transmission/reception circuit a control signal from a common time slot on said time division multiplex transmission lines.

7. A system according to claim 6, wherein the control signal has a format including service indicator data for discriminating the circuit switching call from the packet switching call.

8. A system according to claim 6, wherein said control section performs the program cycle in place of a write/read cycle with respect to said high-speed memory when data to be switched does not exist on said time division multiplex transmission lines.

9. A system according to claim 1, wherein said control section includes means for inhibiting access of an area of said high-speed memory which is assigned to the circuit switching calls.

10. A system according to claim 1, wherein said control section includes means for preventing interruption of a write/read operation of data transmitted through said time division multiplex transmission lines.

* * * * *